Sept. 15, 1931.　　　H. A. HEUGAS　　　1,823,043

JEWELRY CLASP

Filed Sept. 3, 1929

Inventor
Henri Auguste HEUGAS
By Addison A. Armstrong
His Attorney

Patented Sept. 15, 1931

1,823,043

UNITED STATES PATENT OFFICE

HENRI AUGUSTE HEUGAS, OF PARIS, FRANCE

JEWELRY CLASP

Application filed September 3, 1929, Serial No. 390,182, and in France September 11, 1928.

My invention relates to a clasp for bracelets necklaces and other uses of the type which acts as a lengthening and shortening organ, and more particularly to the type of clasp disclosed and claimed in my copending application Serial No. 232,177, filed Nov. 9, 1927.

As more fully disclosed in the above mentioned application to which the present application is a companion, the clasp is of the type which comprises a female member furnished with a spring pawl and a male member provided with a rack, of which the teeth are adapted to enter successively into engagement with the pawl when the male member is inserted by sliding into the female member with a view to closing the clasp.

One of the objects of the invention is to provide lever operated means for displacing the pawl maintaining the male and female members in locked relation.

Other objects of the invention will be obvious to those skilled in the art to which my invention relates in the following description when taken in connection with the accompanying drawings in which—

Figure 1:
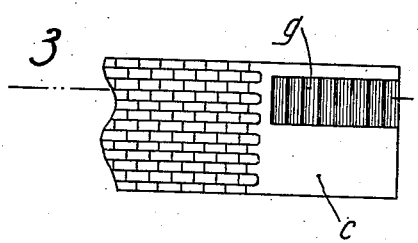
Fig. 1 is partial rear elevational view of a bracelet with the male member of my improved clasp attached thereto.
Figure 2:
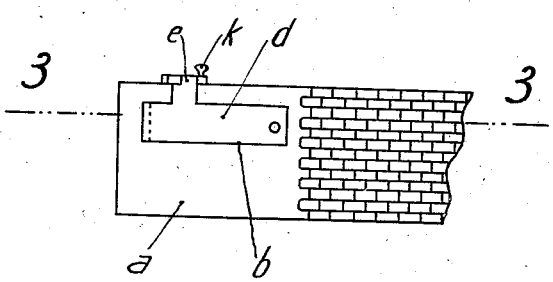
Fig. 2 is a similar view of the female member.
Figure 3:
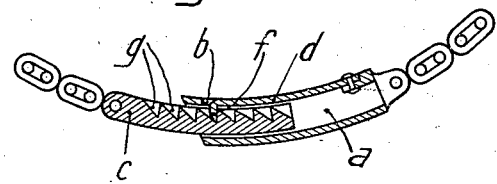
Fig. 3 is a sectional view of the male and female members in engaged position as if taken along the line 3—3 of Figs. 1 and 2.

Referring to the drawings more in detail, a slot $b$ is provided in the lower wall of the female member $a$ of the clasp in which is disposed a resilient tongue $d$ secured to said lower wall near the rear end of said female member as best shown in Fig. 3. Said tongue due to its elasticity may therefore move in the slot $b$ and is provided on one of its edges with a lug $e$ acting as a stop for the two arm lever presently to be described and at its free end with a pawl $f$.

In the lower side of the male member $c$ of the clasp are provided hollow rack teeth $g$ opposite the pawl $f$.

The pawl $f$ and the rack teeth $g$ thus assure catching together of the male and female members in accordance with the graduated rack teeth.

On the side wall of the female member $a$ and opposite the projection $e$ is disposed rotatively on a pivot pin $h$ a two arm lever having arms $i$ and $j$. The arm $j$ carries a button $k$ for manipulating the clasp and the arm $i$ which acts as a cam surface is provided with a lug $l$ which abuts against the lug $e$ during raising of the tongue $d$ thereby limiting the movement of the lever $i j$.

Figure 4:
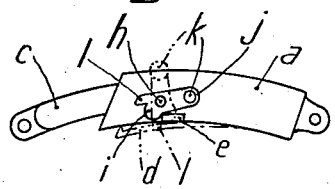
Fig. 4 is a plan view of the male and female members of the clasp in closed position and showing two positions of the releasing pawl.

When the lever is placed longitudinally the lug $e$ is released and the tongue allowed to spring into the slot $b$ as shown in full lines in Fig. 4. When the lever is moved to a transverse position the arm $i$ raises the lug $e$ and hence the tongue $d$ is raised from its slot thereby disengaging the rack $g$ carried by the male member as indicated in dotted lines in Fig. 4.

While I have disclosed what I deem to be the preferred form of my device I do not wish to be limited thereto as there might be various changes in the details of construction and disposition of parts without departing from the spirit of my invention as comprehended within the scope of the appended claims.

Having described my invention what I claim as new and desire to secure by Letters Patent is:

1. A jewelry clasp comprising a male member having rack teeth formed thereon, a female member formed to receive said male member and having a slot formed therein adapted to take up a position opposite said rack teeth, a resilient tongue secured to said female member and mounted in said slot and adapted to normally engage said rack teeth, a lug on said tongue projecting out beyond the edge of said female member, a pivotally mounted two-armed lever on the edge of said female member adapted to cam said tongue through said lug and a stop lug on the camming arm of said lever adapted to abut said first mentioned lug for limiting the movement of said lever.

2. A jewelry clasp comprising a male member having rack teeth formed thereon, a female member formed to receive said male member and having a slot formed therein adapted to take up a position opposite said rack teeth, a resilient tongue secured to said female member and mounted in said slot and adapted to normally engage said rack teeth, a pivotally mounted two-armed lever on said female member adapted to cam said tongue from said slot, and a stop lug on the camming arm of said lever adapted to abut said resilient tongue for limiting the movement of said lever.

In testimony whereof I hereunto affix my signature.

HENRI AUGUSTE HEUGAS.